UNITED STATES PATENT OFFICE.

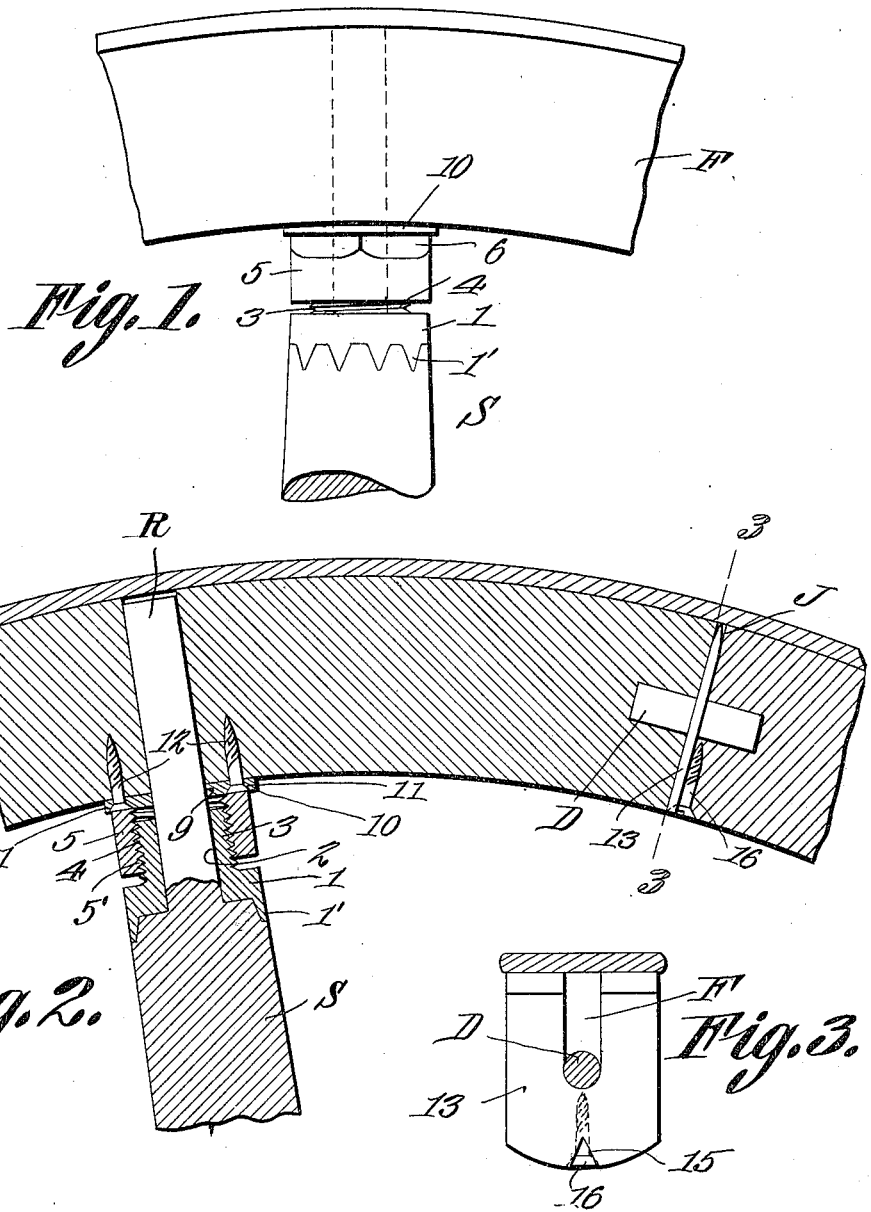

TILLMAN N. GIBSON, OF WEBSTER COUNTY, AND AARON O. FRIDAY, OF MABEN, MISSISSIPPI.

WHEEL-TIGHTENING DEVICE.

1,309,939.  Specification of Letters Patent.  Patented July 15, 1919.

Application filed April 10, 1916. Serial No. 90,171.

*To all whom it may concern:*

Be it known that we, TILLMAN N. GIBSON and AARON O. FRIDAY, citizens of the United States, residing, respectively, in Webster county and Maben, in the counties of Webster and Oktibbeha, State of Mississippi, have invented a new and useful Wheel-Tightening Device, of which the following is a specification.

This invention relates to wheel tightening devices, and more specifically to means for permanently maintaining a rigid connection between the spoke and felly of the wheel.

An object of the present invention is, to provide a positive and compact adjusted means adjustably carried by the spokes for coöperation with the felly of the wheel in order to adjust the tightening of the wheel as the felly is enlarged or stretched by constant usage.

A further object of the invention is to provide a wheel tightening device of generally improved construction, whereby the device will be simple, durable, and inexpensive in construction, as well as convenient, practical, serviceable and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiments in the accompanying drawings, wherein:—

Figure 1 is a side elevation of a portion of a vehicle wheel depicting the adjustable connection between the spokes and felly.

Fig. 2 is a sectional view including the connection between the felly and spoke of the wheel and also depicting one of the seams or joints of the felly.

Fig. 3 is a cross sectional view taken on the line 3—3 of Fig. 2.

In the accompanying drawings, S designates the usual spoke, F the felly and J the joint of seam ordinarily formed in the felly. A ferrule 1 is provided which has a plurality of tapered prongs 1' extending therefrom and adjusted to engage the outer end of the spoke proper, therefore, locking said ferrule against rotation with respect to the spoke S. A tubular extension 3 projects outwardly from the outer face of the ferrule 1, and this extension is exteriorly threaded as indicated at 4, while an axial bore 2 is formed in the ferrule 1 at the tubular extension 3. The usual tenon R extends from the outer end of the spoke S, the outer face of this tenon being embraced by the bore 2, which is common to both the tubular extension 3 and the ferrule 1, thus it is obvious that this ferrule tends to reinforce the spoke tenon R.

An adjusting sleeve 5 is interiorly threaded, as indicated at 5, to threadedly engage the tubular extension 3, and the adjusting sleeve 5 is provided with a wrench engaging surface 6 which enables the said adjusting sleeve to be rotated relative to the ferrule 1. Secured to the inner face of the felly F and around the tenon R is a wear plate or washer 10, which is provided with a plurality of apertures 11 for the reception of screws or other securing elements 12, and an aerial aperture 9 adapted to receive the tenon R. The securing devices 12 are countersunk or let into the washer 10, therefore providing an unobstructed and smooth surface to coöperate with the outer end of the adjusting sleeve 5.

It is well known in the art that when wheel structures have been subjected to continuous usage, that their fellies enlarge, therefore, causing the joints or connections between the spokes and the felly of the wheel to become impaired. However, with this device this objectionable feature is overcome by simply screwing the adjusting sleeve toward the felly, which action causes the outer end of the sleeve to engage the face of the wear plate or washer 10 and thus take up or compensate for the play or movement between the spoke S and felly F.

When the wheels have been subjected to hard or continuous usage, the joints or seams J of the felly F spread, therefore, causing a gap or opening to exist between the adjacent ends of the felly sections. To overcome this objectionable feature, a wedge or shim 13 is provided, which is bifurcated to define opposed parallel legs, 14. This wedge or shim 13 is inserted between the felly sections, thus filling in the space existing in the joint J, and in this position the legs 14 straddle the usual uniting member or dowel D. A recess 15 is formed in the inner terminal of the wedge or shim 13 for the reception of the head of the screw or other securing device 16, which extends into one of the felly sections F and consequently secures the wedge or shim 13 in position.

It is manifest from the preceding description that this invention permits an adjustment to be made between the spoke and felly of the wheel from time to time as these adjustments are necessary, and also, it is manifest that this device does not weaken the joint or connection between the spokes S and fellies F; but on the contrary it materially strengthens the structure.

Having thus described the invention, what is claimed is:—

In a wheel, a felly having relatively movable ends; a dowel pin connecting the ends; a plate between the ends and bifurcated to straddle the pin; and a screw threaded into one of said ends, the screw having a head, and the plate having a notch in its outer end wherein the head is received, the screw constituting means for advancing the plate, the engagement between the head and the notch serving to prevent the plate from working transversely of the pin and projecting beyond the sides of the felly, the coöperation between the head and the notch permitting the head to be countersunk flush with the inner curve of the felly and permitting the inner end of the plate to be disposed flush with the inner curve of the felly.

In testimony that we claim the foregoing as our own, we have hereto affixed our signatures in the presence of two witnesses.

TILLMAN N. GIBSON.
AARON O. FRIDAY.

Witnesses:
D. W. DEAN,
H. T. CUMMINGS.

Copies of this patent may be obtained for five cents each, by addressing the "Commissioner of Patents, Washington, D. C."